United States Patent
Meir et al.

(10) Patent No.: US 10,331,866 B2
(45) Date of Patent: Jun. 25, 2019

(54) USER VERIFICATION FOR CHANGING A SETTING OF AN ELECTRONIC DEVICE

(71) Applicant: Apple Inc., Cupertino, CA (US)

(72) Inventors: Avner Meir, Tiberias (IL); Gilad Elrom, Petah Tikva (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/020,662

(22) Filed: Sep. 6, 2013

(65) Prior Publication Data
US 2015/0074796 A1    Mar. 12, 2015

(51) Int. Cl.
G06F 21/32 (2013.01)
G06F 21/62 (2013.01)
H04W 12/06 (2009.01)
H04L 29/06 (2006.01)
H04W 88/02 (2009.01)

(52) U.S. Cl.
CPC .......... G06F 21/32 (2013.01); G06F 21/6209 (2013.01); H04L 63/0861 (2013.01); H04W 12/06 (2013.01); H04W 88/02 (2013.01)

(58) Field of Classification Search
CPC ...................................................... G06F 21/32
See application file for complete search history.

(56) References Cited

U.S. PATENT DOCUMENTS

| | | | |
|---|---|---|---|
| 5,872,834 A | 2/1999 | Teitelbaum | |
| 6,256,737 B1 | 7/2001 | Bianco et al. | |
| 6,795,569 B1 | 9/2004 | Setlak | |
| 6,845,453 B2 | 1/2005 | Scheidt et al. | |
| 6,892,938 B2 | 5/2005 | Solomon | |
| 6,975,202 B1 * | 12/2005 | Rodriguez | G07C 9/00103 340/10.1 |
| 7,046,139 B2 | 5/2006 | Kuhn et al. | |
| 7,065,184 B2 | 6/2006 | Vishik et al. | |
| 7,110,987 B2 | 9/2006 | Engelhart | |
| 7,210,620 B2 | 5/2007 | Jones | |
| 7,246,244 B2 | 7/2007 | Nanavati et al. | |
| 7,269,737 B2 | 9/2007 | Robinson | |

(Continued)

FOREIGN PATENT DOCUMENTS

| | | |
|---|---|---|
| CN | 1268234 | 9/2000 |
| CN | 1695163 | 11/2005 |

(Continued)

OTHER PUBLICATIONS

Islam et al., "A Biometrics-Based Secure Architecture for Mobile Computing," systems, Applications and Technology Conference (LISAT), 2012 IEEE Long Island, May 4, 2012, pp. 1-5, XP032192493, Section III: Proposed Architecture.

(Continued)

Primary Examiner — Simon P Kanaan
(74) Attorney, Agent, or Firm — Brownstein Hyatt Farber Schreck, LLP

(57) ABSTRACT

An electronic device can include a processing device operatively connected to a biometric sensing device. The processing device can be adapted to compare one or more captured biometric images with respective reference biometric images and change one or more settings of the electronic device or one or more settings of an application on the electronic device only when each captured biometric image matches a respective reference biometric image.

26 Claims, 6 Drawing Sheets

(56) References Cited

U.S. PATENT DOCUMENTS

| | | | |
|---|---|---|---|
| 7,278,025 B2 | 10/2007 | Saito et al. |
| 7,502,761 B2 | 9/2009 | Siegal et al. |
| 7,769,845 B2 | 8/2010 | Baron |
| 7,809,954 B2 | 10/2010 | Miller et al. |
| 7,849,013 B2 | 12/2010 | Engelhart |
| 7,864,987 B2 | 1/2011 | Venkatanna et al. |
| 7,865,439 B2 | 1/2011 | Siefert et al. |
| 7,941,664 B2 | 5/2011 | Wheeler |
| 7,953,671 B2 | 5/2011 | Bishop et al. |
| 7,980,378 B2 | 7/2011 | Jones et al. |
| 8,028,896 B2 | 10/2011 | Carter et al. |
| 8,060,413 B2 | 11/2011 | Castell et al. |
| 8,063,889 B2 | 11/2011 | Anderson et al. |
| 8,064,658 B2 | 11/2011 | Iannone |
| 8,072,060 B2 | 12/2011 | Chou |
| 8,145,916 B2 | 3/2012 | Boshra et al. |
| 8,171,531 B2 | 5/2012 | Buer |
| 8,185,646 B2 | 5/2012 | Headley |
| 8,190,908 B2 | 5/2012 | Jazayeri et al. |
| 8,219,495 B2 | 7/2012 | Niwa |
| 8,230,232 B2 | 7/2012 | Ahmed et al. |
| 8,320,638 B2 | 11/2012 | Pitt et al. |
| 8,336,096 B2 | 12/2012 | Narusawa et al. |
| 8,345,931 B2 | 1/2013 | Jeronimus |
| 8,369,845 B2 | 2/2013 | Zou et al. |
| 8,406,736 B2 | 3/2013 | Das et al. |
| 8,429,760 B2 | 4/2013 | Tribble |
| 8,548,166 B2 | 10/2013 | Wasilewski et al. |
| 8,566,955 B2 | 10/2013 | Pleasant, Jr. et al. |
| 8,572,707 B2 * | 10/2013 | Tuchman et al. ................ 726/7 |
| 8,621,561 B2 | 12/2013 | Cross et al. |
| 8,621,642 B2 | 12/2013 | Bjorn et al. |
| 8,627,417 B2 | 1/2014 | Aoyama |
| 8,627,454 B2 | 1/2014 | Bolyukh |
| 8,635,165 B2 | 1/2014 | Beenau |
| 8,660,322 B2 | 2/2014 | Tsai et al. |
| 8,682,798 B2 | 3/2014 | Patterson |
| 8,745,716 B2 | 6/2014 | Brudnicki |
| 8,762,276 B2 | 6/2014 | Lepisto et al. |
| 8,839,371 B2 | 9/2014 | Ghosh |
| 8,905,303 B1 | 12/2014 | Ben Ayed |
| 8,943,326 B2 | 1/2015 | Tamkhane et al. |
| 9,076,027 B2 | 7/2015 | Miura et al. |
| 9,119,067 B2 | 8/2015 | Santamaria et al. |
| 9,203,845 B2 | 12/2015 | Webber |
| 9,208,337 B2 | 12/2015 | Tayloe |
| 9,411,037 B2 | 8/2016 | Jamtgaard et al. |
| 9,699,168 B2 | 7/2017 | Pieczul et al. |
| 9,721,086 B2 | 8/2017 | Shear et al. |
| 9,723,482 B2 | 8/2017 | Wang et al. |
| 2001/0036299 A1 | 11/2001 | Senior |
| 2002/0018585 A1 | 2/2002 | Kim |
| 2002/0056043 A1 | 5/2002 | Glass |
| 2002/0073416 A1 | 6/2002 | Ramsey Catan |
| 2002/0095586 A1 | 7/2002 | Doyle et al. |
| 2002/0174345 A1 | 11/2002 | Patel |
| 2003/0040339 A1 | 2/2003 | Chang |
| 2003/0046237 A1 | 3/2003 | Uberti |
| 2003/0156740 A1 | 8/2003 | Siegel et al. |
| 2004/0044627 A1 | 3/2004 | Russell et al. |
| 2004/0187009 A1 | 9/2004 | Ebata |
| 2005/0116026 A1 | 6/2005 | Burger et al. |
| 2005/0154920 A1 | 7/2005 | Tartaglia et al. |
| 2005/0229006 A1 | 10/2005 | deMoura et al. |
| 2006/0173793 A1 | 8/2006 | Glass |
| 2006/0204048 A1 | 9/2006 | Morrison et al. |
| 2006/0234764 A1 | 10/2006 | Gamo et al. |
| 2007/0267478 A1 | 11/2007 | Turek et al. |
| 2008/0016371 A1 | 1/2008 | Jiang et al. |
| 2008/0097925 A1 | 4/2008 | King |
| 2008/0103984 A1 | 5/2008 | Choe et al. |
| 2008/0109871 A1 | 5/2008 | Jacobs |
| 2008/0148393 A1 | 6/2008 | Wendt |
| 2008/0195506 A1 | 8/2008 | Koretz et al. |
| 2008/0267464 A1 | 10/2008 | Goda |
| 2009/0083850 A1 | 3/2009 | Fadell et al. |
| 2009/0100269 A1 | 4/2009 | Naccache |
| 2009/0224874 A1 | 9/2009 | Dewar et al. |
| 2009/0240622 A1 | 9/2009 | Zandonadi |
| 2010/0005509 A1 * | 1/2010 | Peckover .................... 726/3 |
| 2010/0099383 A1 * | 4/2010 | Yamagishi ............ H04M 1/673 |
| | | | 455/411 |
| 2010/0218012 A1 | 8/2010 | Joseph et al. |
| 2010/0225607 A1 | 9/2010 | Kim |
| 2010/0241571 A1 | 9/2010 | McDonald |
| 2010/0321197 A1 | 12/2010 | Wong et al. |
| 2011/0082791 A1 | 4/2011 | Baghdasaryan et al. |
| 2011/0119479 A1 * | 5/2011 | Cowie et al. ................. 713/100 |
| 2011/0138450 A1 | 6/2011 | Kesanupalli et al. |
| 2011/0166922 A1 | 7/2011 | Fuerstenberg |
| 2011/0238476 A1 | 9/2011 | Carr et al. |
| 2011/0246766 A1 | 10/2011 | Orsini et al. |
| 2011/0291798 A1 | 12/2011 | Schibuk |
| 2011/0300829 A1 | 12/2011 | Nurmi et al. |
| 2012/0110662 A1 | 5/2012 | Brosnan |
| 2012/0123841 A1 | 5/2012 | Taveau et al. |
| 2012/0237908 A1 | 9/2012 | Fitzgerald et al. |
| 2012/0262399 A1 * | 10/2012 | Colley .................... G06F 3/041 |
| | | | 345/173 |
| 2012/0290376 A1 | 11/2012 | Dryer et al. |
| 2012/0317286 A1 * | 12/2012 | Kawana et al. .............. 709/225 |
| 2012/0330769 A1 | 12/2012 | Arceo |
| 2012/0330784 A1 | 12/2012 | Nahidipour |
| 2012/0331566 A1 | 12/2012 | Lection et al. |
| 2013/0067545 A1 | 3/2013 | Hanes |
| 2013/0081119 A1 | 3/2013 | Sampas |
| 2013/0124416 A1 | 5/2013 | Pawar et al. |
| 2013/0159699 A1 | 6/2013 | Torkkel |
| 2013/0188927 A1 * | 7/2013 | Seryakov et al. ............. 386/248 |
| 2013/0254906 A1 | 9/2013 | Kessler et al. |
| 2013/0298224 A1 | 11/2013 | Heilpern |
| 2014/0006795 A1 | 1/2014 | Han et al. |
| 2014/0007185 A1 | 1/2014 | Han et al. |
| 2014/0007223 A1 | 1/2014 | Han et al. |
| 2014/0136419 A1 | 5/2014 | Kiyohara |
| 2014/0189807 A1 | 7/2014 | Cahill et al. |
| 2014/0279516 A1 * | 9/2014 | Rellas et al. ..................... 705/44 |
| 2014/0347479 A1 | 11/2014 | Givon |
| 2015/0073998 A1 | 3/2015 | Alsina et al. |
| 2015/0081552 A1 | 3/2015 | Stewart |
| 2015/0116086 A1 | 4/2015 | Kim et al. |
| 2015/0186892 A1 | 7/2015 | Zhang et al. |
| 2015/0199687 A1 | 7/2015 | Han et al. |
| 2015/0220931 A1 | 8/2015 | Alsina et al. |
| 2015/0294382 A1 | 10/2015 | Alsina et al. |
| 2015/0304323 A1 | 10/2015 | Alsina et al. |
| 2016/0182508 A1 | 6/2016 | Gresham et al. |
| 2016/0241542 A1 | 8/2016 | Kim et al. |
| 2016/0248769 A1 | 8/2016 | Han et al. |
| 2017/0206528 A1 | 7/2017 | Han et al. |
| 2017/0364918 A1 | 12/2017 | Malhotra et al. |
| 2018/0041506 A1 | 2/2018 | Han et al. |

FOREIGN PATENT DOCUMENTS

| | | |
|---|---|---|
| CN | 1783052 | 6/2006 |
| CN | 1983336 | 6/2007 |
| CN | 101075282 | 11/2007 |
| CN | 101256700 | 9/2008 |
| CN | 101261679 | 9/2008 |
| CN | 101827148 | 9/2010 |
| CN | 101933051 | 12/2010 |
| CN | 102088353 | 6/2011 |
| CN | 102867250 | 1/2013 |
| CN | 103037065 | 4/2013 |
| CN | 103220637 | 7/2013 |
| CN | 103221958 | 7/2013 |
| CN | 103268550 | 8/2013 |
| CN | 103269273 | 8/2013 |
| CN | 103295129 | 9/2013 |
| DE | 202005003042 | 11/2006 |
| DE | 102009027682 | 1/2011 |
| DE | 102012202731 | 8/2013 |
| EP | 1857954 | 11/2007 |

(56) References Cited

FOREIGN PATENT DOCUMENTS

| EP | 2226741 | 9/2010 |
|---|---|---|
| EP | 2114051 | 6/2012 |
| EP | 2533172 A1 | 12/2012 |
| EP | 2597585 | 5/2013 |
| GB | 2447752 | 9/2008 |
| JP | A 2010140174 | 6/2010 |
| JP | A 20111192288 | 9/2011 |
| KR | 1020120122181 | 11/2012 |
| TW | I236634 | 7/2005 |
| TW | 200901724 | 1/2009 |
| TW | 200919255 | 5/2009 |
| TW | 201319817 | 5/2013 |
| WO | WO 03/062969 | 7/2003 |
| WO | WO 08/004312 | 1/2008 |
| WO | WO 08/030184 | 3/2008 |
| WO | WO 13/095434 | 6/2013 |

OTHER PUBLICATIONS

International Search Report and Written Opinion dated Oct. 9, 2014, PCT/US2014/048582, 10 pages.
Office Action dated Jul. 23, 2015, TW 103127815, 16 pages.
Search Report dated Aug. 5, 2015, NL 2013335, 7 pages.
Spencer et al., "iCaughtU Pro review [iPhone]," Publisher: knowyourmobile.com, Dec. 13, 2011, pp. 1-3.
U.S. Appl. No. 15/821,485, filed Nov. 22, 2017, Han et al.

* cited by examiner

USER VERIFICATION FOR CHANGING A SETTING OF AN ELECTRONIC DEVICE

TECHNICAL FIELD

The present invention relates to electronic devices, and more particularly to a biometric sensing device included in, or connected to an electronic device. Still more particularly, the present invention relates to verifying the identity of a user prior to changing one or more settings of an electronic device.

BACKGROUND

Many electronic devices can be accessed directly as well as remotely using input and output devices in the electronic devices. For example, a laptop computer or a smart telephone can interact with another electronic device using a wired and/or wireless network connection such as a cellular connection, a Wi-Fi connection, and an Ethernet connection. Typically, a user can access most or all of the applications, user preferences, data, and/or settings in an electronic device using another electronic device and at least one network service.

In some situations, it can be undesirable to allow a person direct or remote access to an electronic device. For example, when an electronic device is stolen, a thief can access data or information that the owner of the stolen electronic device would like to keep confidential. Additionally, a thief can change one or more settings of the electronic device in an effort to prevent the owner from remotely finding or locating the stolen device, from locking the device, and/or from wiping data from the device. For example, a thief can turn off the stolen device or disable the wireless network connections by changing one or more settings in the electronic device.

SUMMARY

Embodiments described herein can verify the identity of a person attempting to change one or more settings of an electronic device using biometric data. The electronic device can be a portable electronic device such as a smart telephone, a tablet computing device, a laptop computer, digital music player, and the like. The setting or settings can be associated with one or more devices, applications, or functions in, or connected to the electronic device. By way of example only, the identity of the user can be confirmed prior to changing the power setting to turn off the electronic device, or prior to disabling one or more network connections. In one aspect, a method for changing the setting of an electronic device can include receiving a first biometric image of a biometric attribute that is associated with a user and determining if the first biometric image matches a reference biometric image. The setting of the electronic device is changed only when the first biometric image matches the reference biometric image. In some embodiments, a sequence of biometric images can be received and matched to a sequence of reference biometric images before the setting is changed. As one example, a biometric sensing device can be a fingerprint sensor. One or more fingerprint images may be acquired and matched to reference fingerprint images before a setting or settings are changed in the electronic device.

In another aspect, a password can be entered and matched to a reference password, and the setting changed only when a biometric image or a sequence of biometric images match respective reference biometric images and only after the password matches the reference password.

In yet another aspect, the electronic device can be placed in a safe mode when a person attempts to change a setting and the identity of the person cannot be verified with the one or more biometric images. Once the electronic device is in the safe mode, enhanced user identification data may have to be entered before the device can exit the safe mode. The enhanced user identification data can include a safe mode password, the matching of one or more biometric images, entering a matching of different types of biometric images, an account password or pin, one or more correct answers to security questions, and so on, in various combinations.

In another aspect, a user can select which biometric image or sequence of biometric images is to be entered before one or more settings will be changed. The user can also identify which settings will require the selected one or more biometric images. For example, with a fingerprint sensor, a user may identify the number of fingerprint images to be in a sequence, which fingerprint images are to be included in the sequence, and/or the order of the fingerprint images to be included in the sequence of fingerprint images.

And in another aspect, a system can include an electronic device that includes a processing device and a biometric sensing device operatively connected to the processing device. The biometric sensing device can be included in the electronic device, or the biometric sensing device can be a separate device that is connected to the electronic device. The processing device can be adapted to compare one or more captured biometric images with respective reference biometric images and change a setting of the electronic device only when the captured biometric image(s) matches the reference biometric image(s).

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
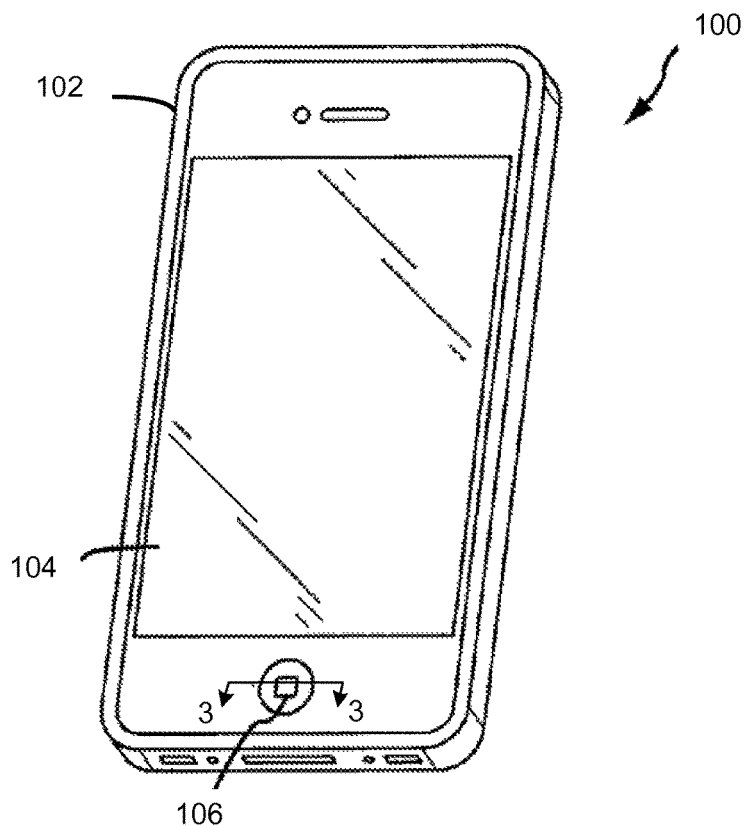
FIG. 1 is a perspective view of an example electronic device that can include a biometric sensing device.

Embodiments described herein allow a user to require a biometric image or a sequence of biometric images be scanned and matched to reference data before a setting is changed in an electronic device. Any suitable biometric data can be used, including, but not limited to, fingerprints, facial recognition, voice recognition, retina recognition, thermal patterns, and vein recognition. As one example, a user can require one or more fingerprint images be input and matched to reference fingerprint images before a power setting that turns off the electronic device is changed. The power setting can be disabled and the device turned off, for example, by pressing down on an on-off button or through a menu displayed on a display of the electronic device.

As another example, a user can require one or more fingerprint images be entered and matched to reference fingerprint images before a network communication setting that disables one or more network services is changed. Requiring a fingerprint or sequence of fingerprints be entered before one or more settings are changed can provide increased security for the electronic device.

In some embodiments, a user can select the level of security for a setting of an electronic device. For example, a user can decide a particular setting does not require a fingerprint be entered prior to changing the setting. Alternatively, a user can require a single fingerprint or a sequence of fingerprints be entered before the setting is changed. If a sequence of fingerprints is to be entered, the user can select the number of fingerprints to be in the sequence, which fingerprints are to be included in the sequence, and/or the order of the fingerprints in the sequence of fingerprints. Additionally, a user can require a password be entered after the fingerprint or sequence of fingerprints have been entered and matched to respective reference fingerprint images.

In some embodiments, the electronic device can be placed in a safe mode when a person attempts to change a setting and the identity of the person cannot be verified with the one or more biometric images. Once the electronic device is in the safe mode, enhanced user identification may be required to exit the safe mode. The enhanced identification can include a safe mode password, the matching of one or more biometric images, the entry and matching of different types of biometric data, an account password or pin, one or more correct answers to security questions, and so on, in various combinations. In some embodiments, attempting to change one or more designated settings can cause the electronic device to enter the safe mode when user verification fails. A designated setting can be a setting that may affect the security of the electronic device. For example, trying to change the power setting, a global positioning system (GPS) setting, and/or a wireless network connection setting can cause the electronic device to be placed in the safe mode when user verification fails.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Referring now to FIG. 1, there is shown a perspective view of one example of an electronic device that can include, or be connected to a biometric sensing device. In the illustrated embodiment, the electronic device 100 is implemented as a smart telephone. Other embodiments can implement the electronic device differently, such as, for example, as a laptop or desktop computer, a tablet computing device, a gaming device, a display, a digital music player, and other types of electronic devices that can receive biometric data from a biometric sensing device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

Figure 2:
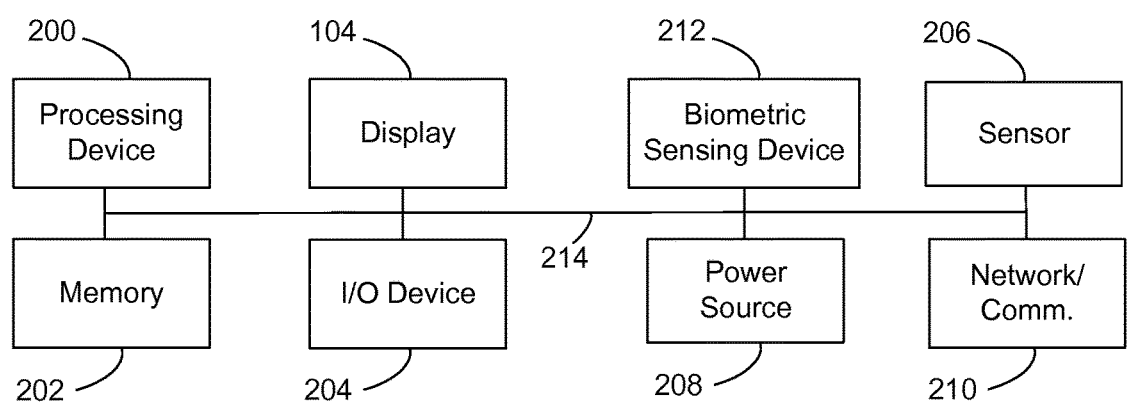
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, a network communications interface 210, and a biometric sensing device 212. The display 104 may provide an image or video output for the electronic device 100. The display may also provide an input region for one or more input devices, such as, for example, a touch sensing device and/or a fingerprint sensor. The display 104 may be substantially any size and may be positioned substantially anywhere on the electronic device 100.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the biometric sensing device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, biometric images, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a trackpad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, biometric data, and so on. For example, the sensor(s) 208 may be an image sensor, a heat sensor, a light or optical sensor, an accelerometer, a pressure transducer, a gyroscope, a magnet, a health monitoring sensor, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The biometric sensing device 212 can be implemented as any suitable biometric sensor, scanner, and/or system. For example, the biometric sensing device can be a facial recognition device, an iris or retina scanner, a vein recognition device that can image the veins in a finger or palm, a facial biometrics scanner, and/or a thermal imaging scanner. In embodiments described herein, the biometric sensing device can be one or more fingerprint sensors. The fingerprint sensor can capture images of one or more fingers, a portion of one or more fingers, and/or some or all of a palm or of a hand. In some embodiments, the fingerprint sensor is positioned at a location that a user's finger, fingers and/or hands are naturally in contact with as the user interacts with the electronic device. For example, an electronic device can include a fingerprint sensor in the display 104, the button 106, the enclosure 102, and/or as a separate electronic device that is connected to the electronic device 100. Additionally, the fingerprint sensor can be implemented with any suitable sensing technology, including, but not limited to, capacitive, resistive, ultrasound, piezoelectric, and thermal sensing technology.

As used herein, the terms "image" and "biometric image" includes an image and other types of data that can be captured by a biometric sensing device. The term "fingerprint image" includes an image and other types of data that can be captured by a fingerprint sensor. By way of example only, a fingerprint sensor can produce a data structure that defines the features in a fingerprint. Additionally, the term "fingerprint image" is meant to encompass an image or other data relating to a fingerprint of some or all of one or more fingers, some or all of a palm, some or all of a hand, and various combinations thereof. The term "finger" is meant to encompass one or more fingers, some or all of a palm, some or all of a hand, and various combinations thereof. And finally, the term "biometric attribute" is meant to encompass a physical or behavioral trait that can be detected by a biometric sensing device.

It should be noted that FIGS. 1 and 2 are illustrative only. In other examples, an electronic device may include fewer or more components than those shown in FIGS. 1 and 2.

Figure 3:
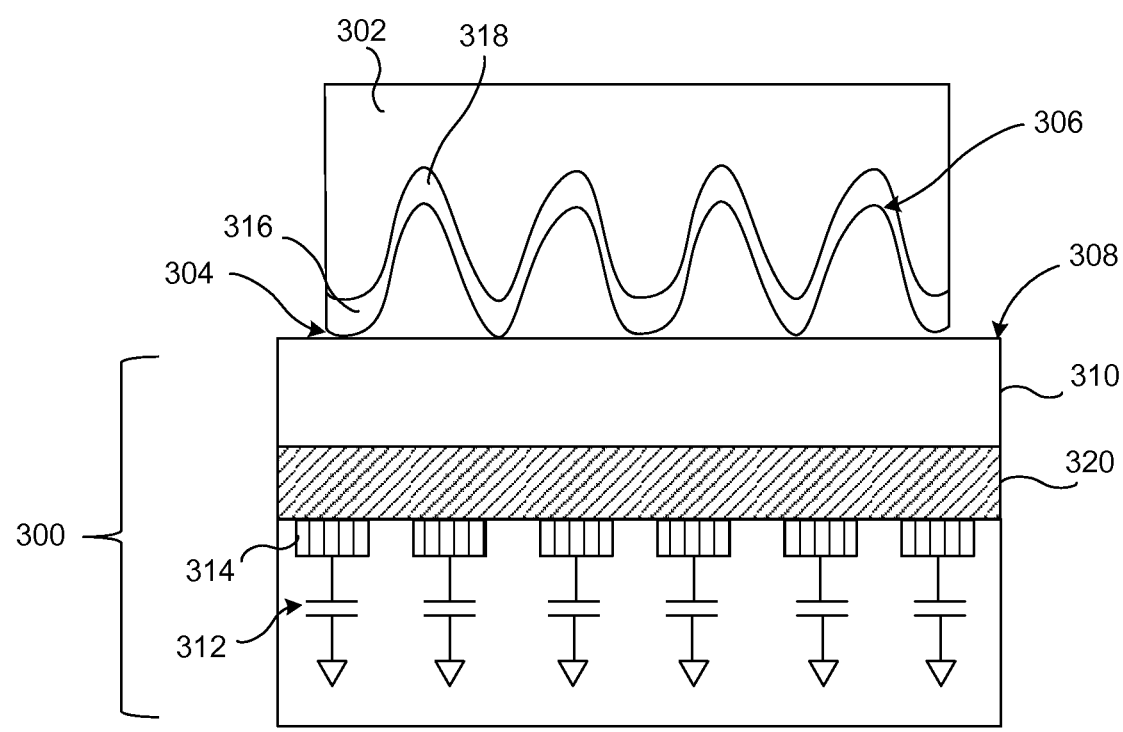
FIG. 3 depicts an enlarged and simplified cross-section view of a portion of a fingerprint sensor taken along line 3-3 in FIG. 1.

A fingerprint sensor will be used to describe various embodiments, with the fingerprint sensor including a capacitive fingerprint sensor. An example construction of a capacitive fingerprint sensor and how the capacitive fingerprint sensor captures a fingerprint is now briefly described. FIG. 3 illustrates an enlarged and simplified cross-section view of a portion of a fingerprint sensor taken along line 3-3 in FIG. 1. A first layer 310 can be disposed over a dielectric layer 320. By way of example only, the first layer 310 can be a dielectric layer such as an exterior surface of a button or other input device (e.g., button 106 in FIG. 1), an exterior surface of an input device such as a trackpad or mouse, and/or a cover glass of a display (e.g., display 104 in FIG. 1). In some embodiments, the dielectric layer 320 can be a color layer that can be used to reduce the visibility of the electrodes and other circuitry of the fingerprint sensor.

The capacitive fingerprint sensor 300 can capture a fingerprint image of at least a portion of the finger 302 by measuring capacitance differences between the finger 302 and the electrodes 314. A fingerprint is generally formed from ridges 304 and valleys 306 arranged in a unique pattern. Typically, the capacitance measured between a ridge 304 and one or more electrodes 314 varies from the capacitance measured between a valley 306 and one or more electrodes 314. The measured capacitance between a ridge and an electrode can be greater than the measured capacitance between a valley and an electrode because the ridge is closer to the electrode. The differences in the measured capacitances can be used to distinguish between ridges and valleys and produce a fingerprint image.

The skin on the finger 302 includes a dead skin layer 316 disposed over a live skin layer 318. The capacitive fingerprint sensor 300 typically images the dead skin layer 316 to obtain an image of the fingerprint. However, if a portion of the dead skin layer 316 is damaged or missing, the capacitive fingerprint sensor can obtain an image of the fingerprint by imaging the live skin layer 318 by itself, or by imaging both the remaining dead skin layer 316 and the exposed live skin layer 318.

Electronic devices typically include one or more settings for devices and functions of the electronic device and/or for one or more applications on the electronic device. The settings can be enabled, disabled and/or modified by a user, generally through a menu or control panel. For example, electronic devices with a display can include a setting for screen brightness, display resolution, display orientation, and/or a background image or wallpaper. Other types of settings can be particular to an application, such as email or a calendar. Electronic devices can have settings relating to a wireless or wired network connection, such an as whether or not the device is connected to a network or other electronic device. The settings can allow a user to select a connection to a particular network, and enable or disable a wireless or wired network connection through an airplane mode and/or through a setting associated with a particular connection (e.g., Bluetooth, WiFi).

In some embodiments, a user may want to have his or her identity verified before a setting is changed. For example, some embodiments allow a user to lock an electronic device or "wipe" or remove data and information from the electronic device remotely when the electronic device is stolen or missing. A user can enter the lock or wipe commands using another electronic device and the commands can be transmitted to the stolen or missing electronic device through a wireless or wired network connection. A thief or person who finds the electronic device, however, can disable the wired and/or wireless network connections by placing the electronic device in airplane mode or by changing the respective settings in the electronic device. These actions may prohibit a user from remotely wiping or locking the device. Additionally or alternatively, the thief or person can turn off a power source in the electronic device, which prevents a user from locking or wiping the stolen device. Thus, verifying the identity of the user before changing a setting can provide additional security and increased protection in situations where an electronic device is lost or stolen.

Alternatively, an owner of an electronic device may want to restrict who can change one or more settings of the electronic device. For example, a parent may not want a child to be able to change one or more settings of an electronic device. Likewise, an employer may not want an employee to be able to change one or more settings of an electronic device. Requiring a fingerprint or a sequence of fingerprints be scanned and matched to reference data before a setting is changed in the electronic device can prohibit non-owners from changing the settings.

Figure 4A:
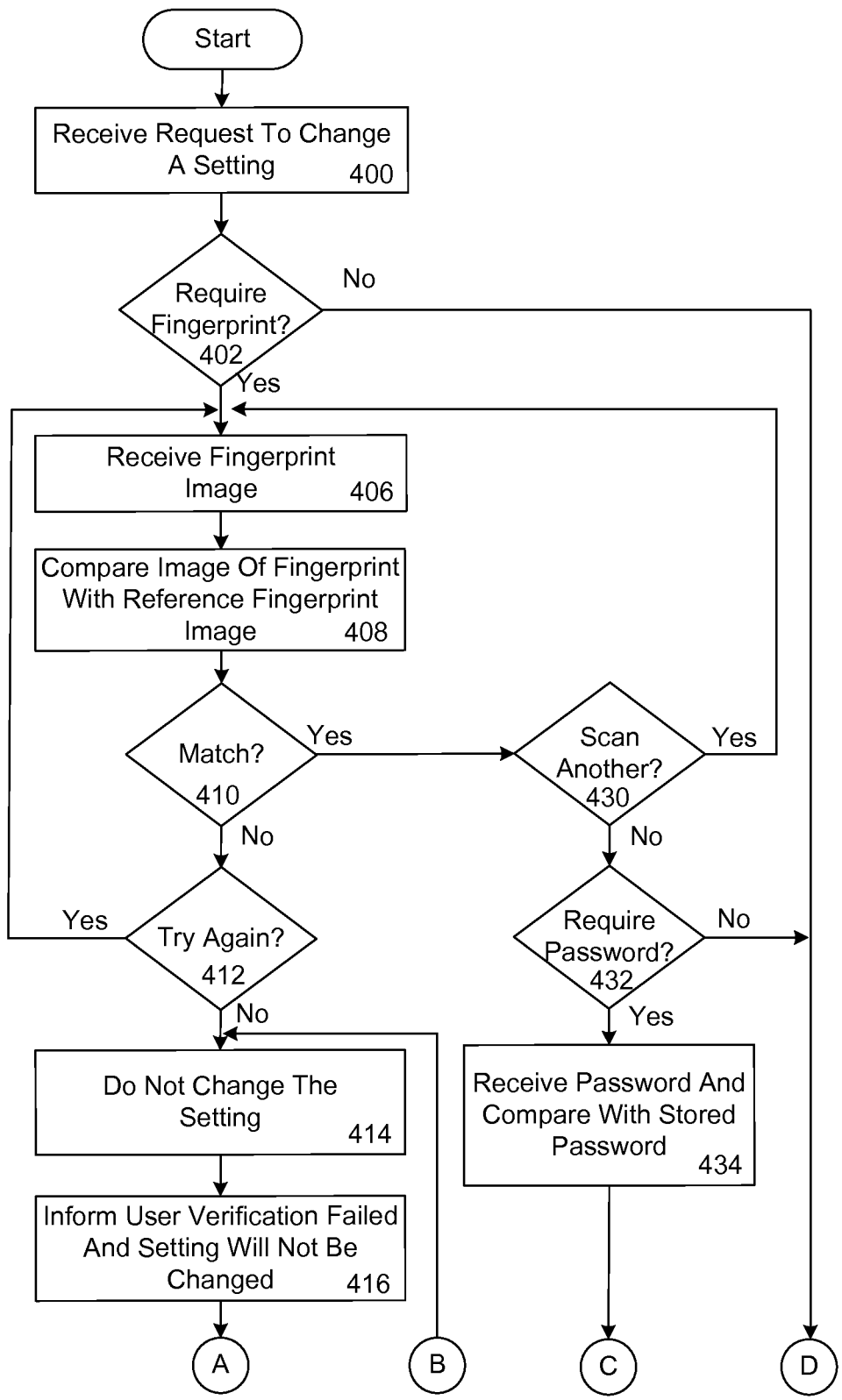
FIGS. 4A-4B illustrate a flowchart of a method for changing a setting of an electronic device.
Figure 4B:
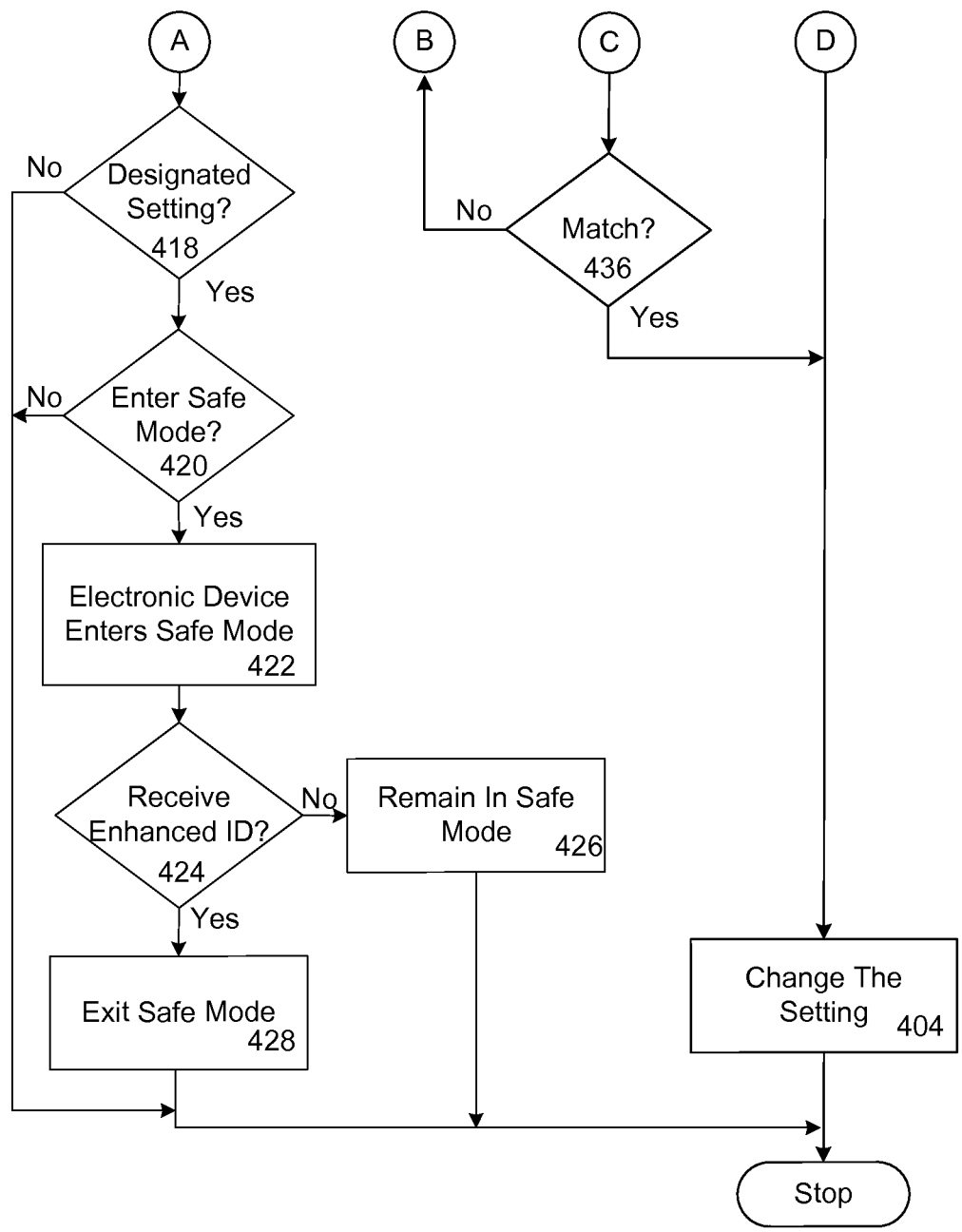

Referring now to FIGS. 4A-4B, there is shown a flowchart of a method for changing a setting of an electronic device. As described earlier, the setting can be associated with one or more devices or functions of an electronic device and/or one or more applications on the electronic device. Initially, a request to change a setting of an application or of the electronic device is received at block 400. By way of example only, a request to disable a wired or wireless network connection or a power setting (i.e., turn off) can be received. A determination is then made at block 402 as to whether a biometric attribute (e.g., a fingerprint) is required to change the setting. If not, the process passes to block 404 where the setting is changed and the method ends.

When a fingerprint is required to change the setting, the process can continue at block 406 where a fingerprint image is received. By way of example only, a user can be prompted to scan or input his or her fingerprint. A user can input the fingerprint by positioning a finger (or fingers) in contact with, or in close proximity to an input region of a fingerprint sensor. For example, a user can position a finger on the button 106 in FIG. 1 when a fingerprint image is to be captured. Alternatively, a fingerprint sensor can capture a fingerprint periodically when a user presses the button 106 and use the most recent fingerprint image in block 406.

The fingerprint sensor or the electronic device can then compare the captured fingerprint image with a reference fingerprint image and determine whether the captured fingerprint image matches the reference fingerprint image (blocks 408 and 410). For example, a processing device (e.g., processing device 200 in FIG. 2) in the electronic device can receive the captured fingerprint image from the fingerprint sensor (e.g., biometric sensing device 212), read the reference fingerprint image from a memory (e.g., memory 202), and compare the two to determine if the two match. If the captured fingerprint image does not match the reference fingerprint image, a determination can be made at block 412 as to whether or not the user can try again to scan his or her fingerprint. In some situations, a user may move a finger when the fingerprint is being scanned, or a user may have contaminants (e.g., sweat, dirt) on a finger that can adversely affect the process of capturing the fingerprint image. In some embodiments, a user can specify whether or not additional scans can be performed, and the number of additional scans to be performed.

If the user will try again to capture a fingerprint image, the process returns to block 406 and repeats until the fingerprint is scanned successfully or the number of attempts to scan the fingerprint reaches a predetermined number or limit. If the user will not be attempting to re-scan the fingerprint at block 412, the method continues at block 414 where the setting is not changed. The user can be informed of the unsuccessful setting change at block 416. By way of example only, a notification regarding the failed user authentication can be presented to the user on a display of the electronic device. Additionally or alternatively, a haptic device can provide haptic feedback based on the failed verification, or a speaker can output audio feedback based on the failed authentication.

In some embodiments, when user verification fails, an assumption can be made that the person trying to change a setting is not the actual owner or user of the electronic device. This may be particularly true if the requested setting change was for a designated setting. In one embodiment, designated settings can be the settings that affect the security of the electronic device, such as the airplane mode setting, the power setting, the network connection settings, the global positioning system setting, and the passcode setting. In some embodiments, a user can select some or all of the settings to be designated settings. Thus, at block 418 a determination can be made as to whether the setting that was not changed at block 414 is a designated setting. If not, the method can end.

When the setting is a designated setting, the process passes to block 420 where a determination is made as to whether the electronic device is to be placed in a safe mode based on the failed verification. A user can elect to have the device enter the safe mode upon the failed user authentication. Additionally or alternatively, an electronic device can be configured to always enter the safe mode upon a failed user verification, and the user may or may not be able to opt out of the safe mode. In some embodiments, a biometric attribute, such as a fingerprint, may have to be entered in order to change a safe mode setting, such as when opting out or changing the types of enhanced user identification data that has to be entered to exit the safe mode. This allows individuals such as a device owner, an employer, and/or a parent to control activation, deactivation, and/or modification of the safe mode and the safe mode settings.

If the safe mode is to be entered, the process continues at block 422 where the electronic device is placed in the safe mode. The safe mode can be similar to a device lockdown mode in that a person cannot interact with a number of functions or applications of the device while the device is in the safe mode. The user may only be able to access one or more security screens, dialog boxes, or other input mechanisms that permit the user to enter enhanced user identification data before the electronic device can exit the safe mode. As described earlier, the enhanced user identification data can include various combinations of a safe mode password, the matching of biometric images, the entry and matching of different types of biometric attributes, an account password or pin, one or more correct answers to security questions, and so on. A safe mode password can be a password only used to exit the safe mode. A user may have to enter different types of biometric attributes, such as a fingerprint image and their voice for voice recognition.

A determination can then be made at block 424 as to whether or not the appropriate enhanced user identification data is received. If not, the electronic device can remain in the safe mode (block 426) and the method ends. When the appropriate enhanced user identification data is received, the electronic device can exit the safe mode at block 428 and the method ends.

Returning to block 410, if the scanned fingerprint image matches the reference fingerprint image, the process passes to block 430 where a determination is made as to whether another fingerprint image is to be captured. In some embodiments, a user can require that a sequence of fingerprints be captured and matched to a sequence of reference images before a setting is changed. The user can specify the number of fingerprints in the sequence, which fingerprints are included in the sequence, and/or the order of the fingerprints in the sequence. For example, a user can require that two fingerprints be captured before a setting is changed, and the fingerprints to be scanned along with the order of the scans are the right index finger and the left ring finger.

If another fingerprint is to be scanned, the method returns to block 406. If another fingerprint will not be captured, the process continues at block 432 where a determination is made as to whether or not a password is also required to change the setting. If a password is not required, the setting is changed at block 404 and the method ends.

If a password is also required to change the setting, the method continues at block 434 where the password is received and compared with a stored or reference password. For example, a user can be prompted to enter the password by displaying a dialog box on a display of the electronic device. A determination is then made at block 436 as to whether or not the entered password matches the reference password. If not, the process returns to block 414. If the entered password matches the reference password, the setting is changed at block 404 and the method ends.

Those skilled in the art will recognize that the other embodiments can perform the method shown in FIGS. 4A-4B differently. For example, some blocks can be omitted or the blocks can be performed in a different order. As one example, block 412 and/or block 416 can be optional and omitted in one embodiment. As another example, blocks 432, 434, 436 can be optional and omitted in another embodiment. In some embodiments, block 418 or blocks 418 and 420 can be omitted and the electronic device can be placed in the safe mode every time user authentication fails.

Additionally or alternatively, different biometric attributes can be input and verified before a setting is changed. As one example, a verification process can include matching a fingerprint and inputting a voice sample for a voice recognition system. As another example, a verification process can include inputting a voice sample for a voice recognition system and capturing an image of a user's face for a facial recognition system.

Figure 5:
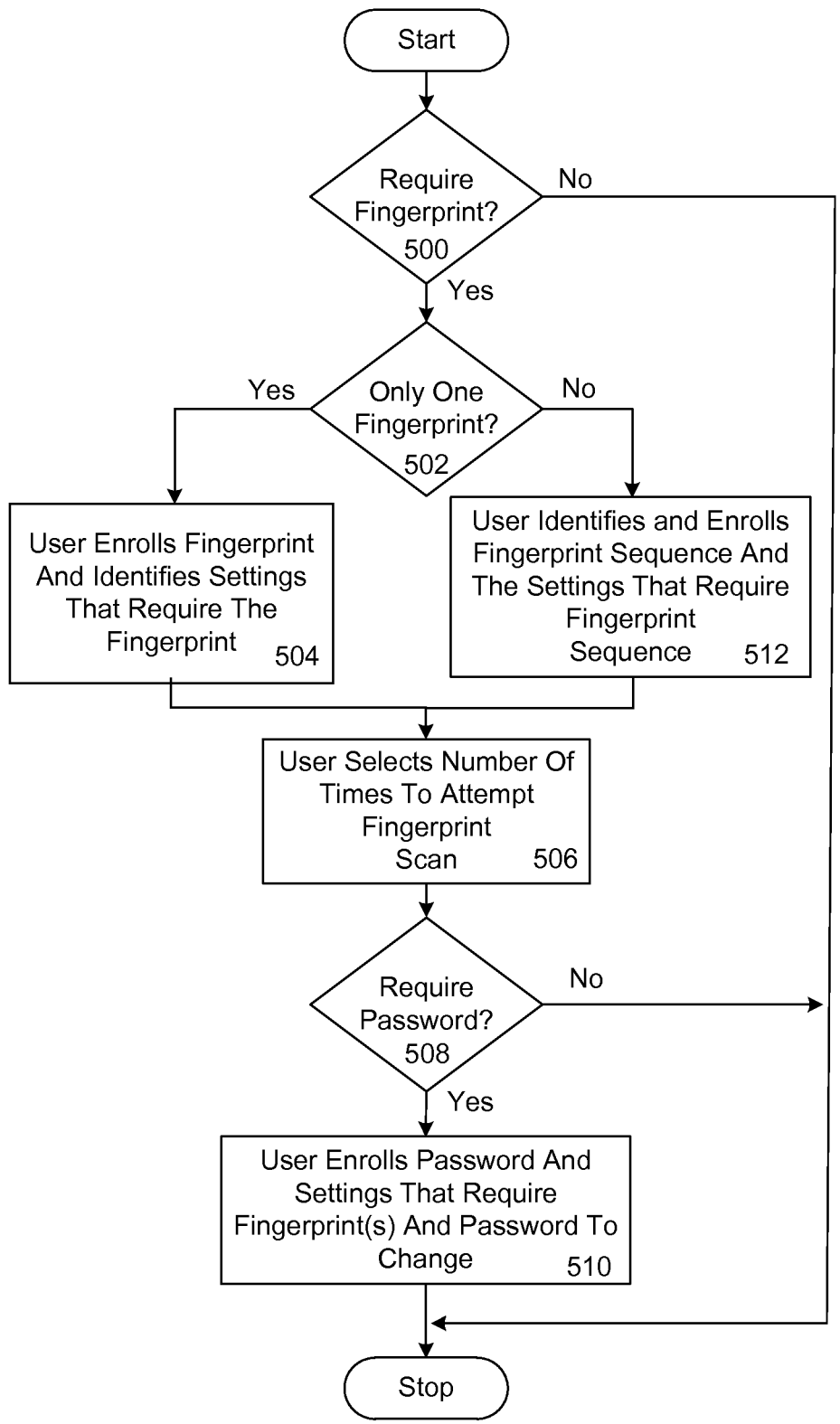
FIG. 5 depicts a flowchart of a method for determining one or more requirements for changing a setting of an electronic device.

In some embodiments, a user can customize the requirements needed to change a setting. FIG. 5 depicts a flowchart of a method for determining one or more requirements for changing a setting of an electronic device. Initially, a determination can be made at block 500 as to whether a fingerprint or a sequence of fingerprints will have to be entered to change a setting. The method ends if one or more fingerprints will not have to be entered to change the setting. Otherwise, the process continues at block 502 where a determination is made as to whether a single fingerprint will have to be entered to change a setting. If a single fingerprint will have to be entered, the method continues at block 504 where a user enrolls the desired fingerprint and identifies which setting or settings will require that fingerprint to be entered before the setting(s) is changed.

An enrollment process can include capturing one or more fingerprint images of the desired finger and storing the fingerprint image(s) in a memory (e.g., memory 202 in FIG. 2). At least one stored fingerprint image can be a reference fingerprint image.

Any suitable method can be used to select the one or more settings that will require the desired fingerprint to be entered prior to changing the setting. By way of example only, one or more settings can be selected through a menu, such as through a list of settings, or through a dialog box that can be included in a settings manager or in each setting panel.

After the fingerprint is enrolled and the settings selected at block 504, the method continues at block 506 where a user can select the number of times to try and re-scan a fingerprint image after the first attempt is unsuccessful. The number can be used as part of the operation in block 412 of FIG. 4. A user can enter any given number, including zero.

A determination can then be made at block 508 as to whether or not the user also wants a password to be entered before the setting(s) is changed. If not, the method ends. If a password is to be entered, the user enrolls the password and identifies the setting or settings that will require the password at block 510. Selection of the setting(s) can be similar to the process described in conjunction with block 504.

Any suitable technique can be used to enroll the password. For example, the password can be enrolled by a user entering the password in a dialog box. In some embodiments, the password can be a fixed number of letters, numbers and/or characters or the user can specify the length of the password and/or the content of the password. The method ends after the setting or settings are identified and the password is enrolled.

Returning to block 502, if a user wants to require the entry of more than one fingerprint before a setting is changed, the method passes to block 512 where the user can specify the number of fingerprints in the sequence, which fingerprints are included in the sequence, and/or the order of the fingerprints in the sequence. The user enrolls the fingerprint sequence and identifies the setting or settings that will require the sequence of fingerprints be entered before the setting is changed. The method then continues at block 506.

Those skilled in the art will recognize that the other embodiments can perform the method shown in FIGS. 5A-5B differently. For example, some blocks can be omitted or the blocks can be performed in a different order. As one example, blocks 508 and 510 can be optional and omitted in one embodiment. As another example, block 506 can be optional and omitted in another embodiment.

Additionally or alternatively, when different biometric attributes are to be input and verified before a setting is changed, a user may specify which biometric attributes and the entry order of the biometric attributes. As one example, a user can specify a fingerprint be entered and matched first followed by the capturing of an image of the user's face for a facial recognition system.

Figure 6:
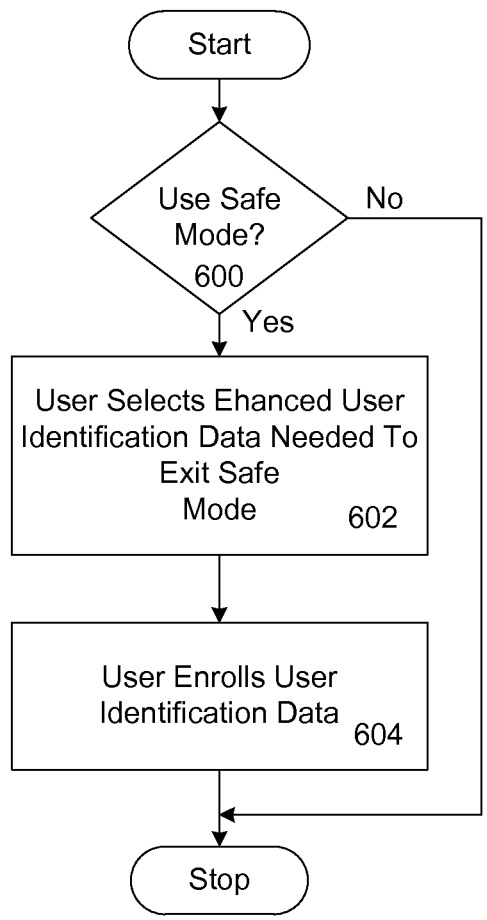
FIG. 6 illustrates a flowchart of a method for customizing a safe mode in an electronic device.

Referring now to FIG. 6, there is shown a flowchart of a method for customizing a safe mode in an electronic device. Initially, a determination can be made at block 600 as to whether a safe mode is to be enabled in an electronic device. In some embodiments, a user can elect to use the safe mode, or a user can opt out of the safe mode. The method ends if the safe mode will not be enabled in the electronic device.

When the safe mode is to be used, the process continues at block 602 where a user can select the enhanced user identification data that will need to be entered in order to exit the safe mode. The user may select the types of user identification data and/or the sequence order of user identification data. For example, a user can require a safe mode password be entered first, followed by one or more images of biometric attributes such as fingerprints. Additionally or alternatively, an account password or pin can be selected, or one or more answers to security questions can be required.

Next, as shown in block 604, the user enrolls the enhanced user identification data. Enrollment can include entering the enhanced user identification data through keypads, dialog boxes, pull down menus, and the like. The entries can then be saved in a memory, such as memory 202 in FIG. 2.

As described previously, biometric sensing devices other than fingerprint sensors can be included or connected to an electronic device. Thus, images or data relating to other types of biometric attributes can be used in other embodiments. For example, an image or data relating to a user's face, vein patterns, retina, iris, and thermal patterns can be required to change one or more settings of an electronic device, and/or to exit a safe mode.

Various embodiments have been described in detail with particular reference to certain features thereof, but it will be understood that variations and modifications can be effected within the spirit and scope of the disclosure. For example, a fingerprint sensing device can include a different type of sensing elements. Additionally or alternatively, a processing channel can include any number of variable gain amplifiers and/or variable offset circuits.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for operating a smart telephone, the method comprising:
   receiving an attempt to turn off the smart telephone while the smart telephone is turned on;
   receiving, in response to receiving the attempt to turn off the smart telephone, a first biometric image of a biometric attribute that is associated with a user;
   determining if the first biometric image matches a first reference biometric image that is associated with a user authorized to turn off the smart telephone; and
   if the first biometric image does not match the first reference biometric image:
      not turning off the smart telephone;
      placing the smart telephone in a safe mode that locks the smart telephone and requires one or more additional items of user identification data to exit the safe mode, the one or more additional items of user identification data differing from the first biometric image; and
      providing an input screen that is configured to be displayed while in the safe mode, the input screen configured to receive at least one of the one or more additional items of user identification data to exit the safe mode.

2. The method as in claim 1, wherein:
   the one or more additional items of user identification data comprise a second biometric image; and
   the method further comprises determining if the second biometric image matches a second reference biometric image, wherein the smart telephone is turned off when the first biometric image matches the first reference biometric image and the second biometric image matches the second reference biometric image.

3. The method as in claim 1, wherein:
   the one or more additional items of user identification data comprise a password; and
   the method further comprises:
      determining if the password matches a user-created reference password; and
      turning off the smart telephone only when the first biometric image matches the first reference biometric image and the password matches the user-created reference password.

4. The method as in claim 1, further comprising:
   providing an input screen that receives a re-entered first biometric image when the first biometric image does not match the first reference biometric image;
   receiving the re-entered first biometric image;
   determining if the re-entered first biometric image matches the first reference biometric image; and
   if the re-entered first biometric image matches the first reference biometric image, turning off the smart telephone.

5. The method as in claim 1, further comprising:
   prompting the user to provide the biometric attribute; and
   capturing the first biometric image of the biometric attribute.

6. The method as in claim 1, wherein receiving the first biometric image of the biometric attribute associated with the user comprises receiving the first fingerprint image associated with the user.

7. A smart telephone, comprising:
   a processing device; and
   a biometric sensing device operatively connected to the processing device, wherein
   the processing device is adapted to:
      receive a request to disable one of the smart telephone or a network interface of the smart telephone;
      in response to receiving the request, verify whether the request is from a user authorized to disable the at least one of the smart telephone or the network interface by capturing a first biometric image and comparing the first captured biometric image with a reference biometric image; and
      if the first captured biometric image does not match the reference biometric image, place the smart telephone in a safe mode that locks the smart telephone and prevents disabling of the smart telephone or the network interface of the smart telephone; wherein:
   the safe mode comprises an input screen adapted to be displayed while in the safe mode, the input screen adapted to receive additional user identification data to exit the safe mode, the additional user identification data comprising:
      a second captured biometric image different from the first captured biometric image; and
      a password.

8. The smart telephone as in claim 7, wherein the biometric sensing device is included in the smart telephone.

9. The smart telephone as in claim 7, wherein the processing device is further adapted to compare an entered password with a reference password and disable the smart telephone or the network interface of the smart telephone only when captured biometric image matches reference biometric image and the entered password matches the reference password.

10. The smart telephone as in claim 7, wherein the processing device is adapted to compare a sequence of captured biometric images with a sequence of reference biometric images and disable the smart telephone or the network interface of the smart telephone only when the sequence of captured biometric images matches the sequence of reference biometric images.

11. The smart telephone as in claim 7, further comprising:
a memory operatively connected to the processing device, wherein the memory stores at least one reference biometric image; and
an input/output device operatively connected to the processing device.

12. The smart telephone as in claim 11, wherein disabling the network interface comprises turning off a wireless network connection.

13. The smart telephone as in claim 7, further comprising a power source.

14. The smart telephone as in claim 13, wherein disabling the smart telephone comprises turning off the power source of the smart telephone.

15. The smart telephone as in claim 7, wherein the biometric sensing device comprises a fingerprint sensor and the first captured biometric image, the second captured biometric image, and the reference biometric image each comprise a fingerprint image.

16. The method as in claim 1, wherein the one or more additional items of user identification data further comprise a safe mode password that is only used to exit the safe mode.

17. The method as in claim 1, further comprising exiting the safe mode based on authentication of the one or more additional items of user identification data.

18. A method for operating a tablet computing device, the method comprising:
receiving a request to change one setting of the tablet computing device, the one setting being a setting associated with a wireless network communication interface in the tablet computing device or a setting configured to turn off a power source in the tablet computing device;
receiving, in response to receiving the request to change the one setting, a fingerprint image that is associated with a user;
determining if the fingerprint image matches a reference fingerprint image that is associated with a user authorized to change the one setting; and
if the fingerprint image does not match the reference fingerprint image:
not changing the one setting;
placing the tablet computing device in a safe mode that locks the tablet computing device and requires one or more additional items of user identification data to exit the safe mode; and
providing an input screen that is configured to be displayed while in the safe mode, the input screen configured to receive the one or more additional items of user identification data to exit the safe mode;
receiving the one or more additional items of user identification data;
determining if the received one or more additional items of user identification data match reference one or more additional items of user identification data stored by the tablet computing device; and
if the received one or more additional items of user identification data match the reference one or more additional items of user identification data, exiting the safe mode.

19. The method as in claim 18, wherein the one or more additional items of user identification data comprise a safe mode password that is only used to exit the safe mode.

20. The method as in claim 18, wherein the one or more additional items of user identification data comprise biometric data that is different from a fingerprint image.

21. A method for operating a portable electronic device, the method comprising:
receiving a button press as part of an attempt to turn off the portable electronic device while the portable electronic device is turned on;
receiving, in response to receiving the attempt to turn off the portable electronic device, a biometric image of a biometric attribute associated with a current user of the portable electronic device;
determining if the biometric image matches a reference biometric image that is associated with a user authorized to turn off the portable electronic device; and
if the biometric image does not match the reference biometric image:
leaving the device turned on and not turning off the portable electronic device.

22. The method as in claim 21, further comprising placing the portable electronic device in a safe mode that locks the portable electronic device and requires one or more additional items of user identification data to exit the safe mode when the biometric image does not match the reference biometric image.

23. A method for operating a portable electronic device, the method comprising:
receiving an attempt to disable operation of wireless network connections of the portable electronic device while the electronic device is turned on;
receiving, in response to receiving the attempt to disable operation of wireless network connections of the portable electronic device, a biometric image of a biometric attribute associated with a current user of the portable electronic device;
determining if the biometric image matches a reference biometric image that is associated with a user authorized to disable operation of wireless network connections of the portable electronic device; and
if the biometric image does not match the reference biometric image:
maintaining the operation of the wired or wireless network function.

24. The method as in claim 23, further comprising placing the portable electronic device in a safe mode that locks the portable electronic device and requires one or more additional items of user identification data to exit the safe mode when the biometric image does not match the reference biometric image.

25. The method as in claim 21, wherein the button press is received from an on-off button.

26. The method as in claim 21, further comprising:
prompting the current user to provide the biometric attribute in response to receiving the attempt to turn off the portable electronic device.

* * * * *